Dec. 17, 1968  H. F. HUNGER ET AL  3,416,963
ELECTROCHEMICAL CELL
Filed Oct. 6, 1965
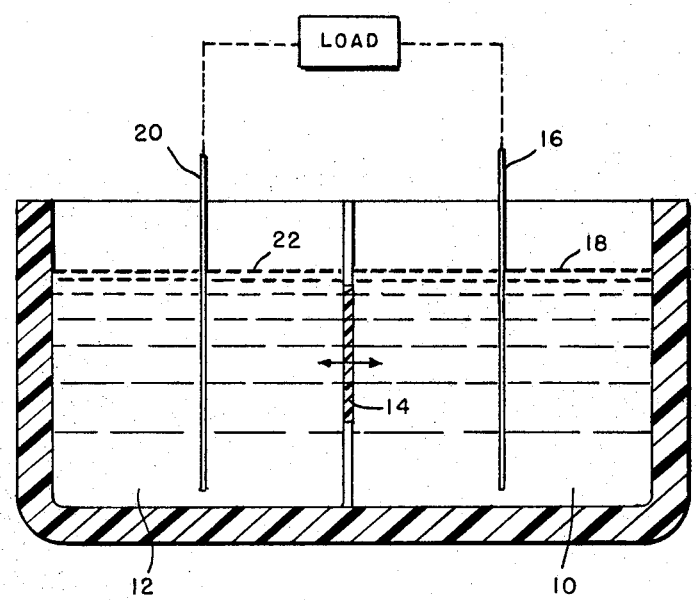
INVENTORS,
HERBERT F. HUNGER
NUNZIO J. SANFILIPPO
JAMES E. WYNN
BY
ATTORNEYS

3,416,963
ELECTROCHEMICAL CELL

Herbert F. Hunger, Long Branch, Nunzio J. Sanfilippo, West Long Branch, and James E. Wynn, Neptune, N.J., assignors to the United States of America as represented by the Secretary of the Army
Filed Oct. 6, 1965, Ser. No. 493,588
2 Claims. (Cl. 136—6)

The invention described herein may be manufactured and used by or for the Government for governmental purposes without the payment of any royalty thereon.

This invention relates to an electrochemical cell capable of producing periodic voltage, current and power outputs.

A general object of this invention is to obtain an electrical power source with a pulsating output current and voltage. A more specific object of this invention is to obtain an electrochemical cell which directly produces pulsating electrical power.

It has now been found that the foregoing objectives can be attained by an electrochemical cell which can be described as:

$$(-)Pt, Pt/Ch_2O, H_2SO_4/H_2SO_4/PbO_2(+)$$

According to the invention, the electrochemical cell includes a cathode compartment and an anode compartment separated by a cation exchange resin membrane. The anode compartment includes a platinized platinum electrode in an electrolyte of sulfuric acid containing formaldehyde. The cathode compartment includes a lead dioxide electrode in an electrolyte of sulfuric acid.

The invention can be best understood by referring to the drawing wherein there is shown a schematic view of an electrochemical cell according to the invention.

Referring to the drawing, the electrochemical cell includes an anode compartment 10, and a cathode compartment 12; the compartments being separated by a cation exchange resin membrane 14. The anode compartment 10 includes a platinized platinum electrode 16, in a sulfuric acid electrolyte 18, containing formaldehyde. The cathode compartment 12 includes a lead dioxide electrode 20 in an electrolyte of sulfuric acid 22.

When the electrochemical cell is electrically connected to a load as shown in the drawing, periodic current and voltage oscillations are observed with varying amplitudes of current and voltage and varying waveforms. The frequencies of the oscillations were found to be proportional to the load current.

In one embodiment of the invention, the electrochemical cell comprised a cell casing of Lucite and a cathode compartment and an anode compartment within the cell casing; the compartments being separated by a cation exchange resin membrane. The cathode compartment 12 includes four spaced lead dioxide electrodes in parallel arrangement in 43 milliliters of 3.75 molar sulfuric acid. The anode compartment 10 includes a platinized platinum electrode in 16 milliliters of 3.75 molar sulfuric acid containing 2 volume percent of formaldehyde as an electrolyte soluble reagent. The cell casing is covered with a Lucite cell case cap designed with two vents for gases that are formed during operation to escape. When suitable external load is connected across the positive lead and negative platinum terminal posts a pulsating current results. With an external load of 2 ohms, for example, the amplitude of the voltage oscillation was found to be 0.41 volt and the current oscillation was 0.21 ampere. The frequency of the oscillation was found to be 0.9 cycle per second.

It is not exactly understood how or why the pulsating current, voltage, and power output is obtained from the electrochemical cell of the invention. However, one possible explanation is the following suggested mechanism. Formaldehyde hydrate can form radicals, formic acid, hydrogen, and other intermediates chemically in starting reactions. Carbon monoxide is also a possible intermediate reactant.

$$CH_2(OH)_2 \rightarrow CHO. + H. + HOH$$
$$CHO. + HOH \rightarrow HCOOH + H.$$
$$HCOOH \rightarrow CO + HOH$$

These intermediates must be adsorbed at the anode to be reacted further. Atomic hydrogen may even be occluded in the platinum lattice. These reactions for a single oscillation cycle are considered to be catalytic dehydrogenation reactions. The hydrogen, the most easily oxidizable specie, can become anodically oxidized. This reaction is the initial potential and current determining reaction.

$$H. \rightarrow H^+ e^-$$

A high current with low anodic polarization results during this reaction. As the electrode coverage with hydrogen decreases during the anodic oxidation, the coverage of the electrode surface with, for example, formic acid increases. This leads to a lower anodic current and an increase in the anodic polarization. At this higher anodic potential, complete oxidation of the organic surface layer to carbon dioxide occurs; that is, $$HCOOH \rightarrow CO_2 + 2H^+ + 2e^-$$

or $$CO + HOH \rightarrow CO_2 + 2H^+ + 2e^-$$

As the sites are freed of the organic surface layer, hydrogen again covers the uncovered sites at the anode surface. The anode, covered now with hydrogen, returns back to the potential of a hydrogen electrode exhibiting again a low anodic polarization. Simultaneously, a maximum current is again observed during its oxidation. After the hydrogen is anodically consumed, buildup of the surface coverage with the intermediate again occurs and the oscillation cycle is repeated.

The platinum anode used in the cell is fabricated by cutting a thin plate of platinum from platinum foil (0.075 centimeter in thickness). The platinum plate had a cross-sectional area of 2.54 centimeters by 0.952 centimeter and a total geometric area of 4.84 square centimeters. The terminal post, also cut from the foil is formed around a small glass rod for rigidity and spot welded to the platinum plate. The platinum anode is then platinized in a solution of chloroplatinic acid ($H_2PtCl_6.6H_2O$) containing 4.5 grams of the salt in 150 milliliters of distilled water at room temperature. The anode in the pulsating electrochemical cell as heretofore described which constitutes a platinized platinum sheet at which the anodic oxidation of formaldehyde occurs, can be modified in various ways. Thus, the anode material might be changed, the fuel might be changed, and/or the operating conditions might be changed. For example, an anode could be formed by an electrochemical couple including a passivating metal sheet like iron in oxidizing acids.

Similarly, the cathode of the heretofore described electrochemical cell which constitutes a lead dioxide cathode as is used in the lead dioxide storage battery can be modified. Thus, a material characterized by a high positive oxidation potential could be used such as chlorine gas at a proper electrode, various oxide electrodes, or redox electrodes. Changes of the electrolyte and soluble reagent concentration in the electrolyte within a reasonable range can be made without significantly changing the oscillation phenomenon. The cation exchange resin membrane can also be replaced by other suitable separators such as a porous polyvinyl chloride sheet.

The pulsating output characteristic of the electrochemical cell of the invention enables its use directly for obtaining pulsating direct current with all predictable applications in DC-AC transformation, triggering, pace making, etc.

The foregoing description is to be considered only as illustrative of the invention and not in limitation thereof.

What is claimed is:

1. An electrochemical cell for producing pulsating voltage, current, and power outputs, said electrochemical cell comprising a cathode compartment and an anode compartment separated by a cation exchange resin membrane separtor, said cathode compartment including a lead dioxide electrode in sulfuric acid electorlyte and said anode compartment including a platinized platinum electrode in sulfuric acid electrolyte containing a formaldehyde as an electrolyte soluble reagent.

2. An electrochemical cell for producing pulsating voltage, current, and power outputs, said electrochemical cell comprising a cathode compartment and an anode compartment separated by a cation exchange resin membrane separator, said cathode compartment including a lead dioxide electrode in 3.75 molar sulfuric acid electrolyte and said anode compartment including a platinized platinum electrode in 3.75 molar sulfuric acid electrolyte containing 2 volume percent of formaldehyde as an electrolyte soluble reagent.

References Cited

UNITED STATES PATENTS

| 3,032,600 | 5/1962 | Mayer | 136—6 |
| 3,110,630 | 11/1963 | Wolfe | 136—154 |

WINSTON A. DOUGLAS, *Primary Examiner.*

A. SKAPARS, *Assistant Examiner.*

U.S. Cl. X.R.

204—242